J. KIRCHHOFF.
ATTACHMENT FOR MOTOR VEHICLES.
APPLICATION FILED NOV. 12, 1915.
1,193,154.
Patented Aug. 1, 1916.
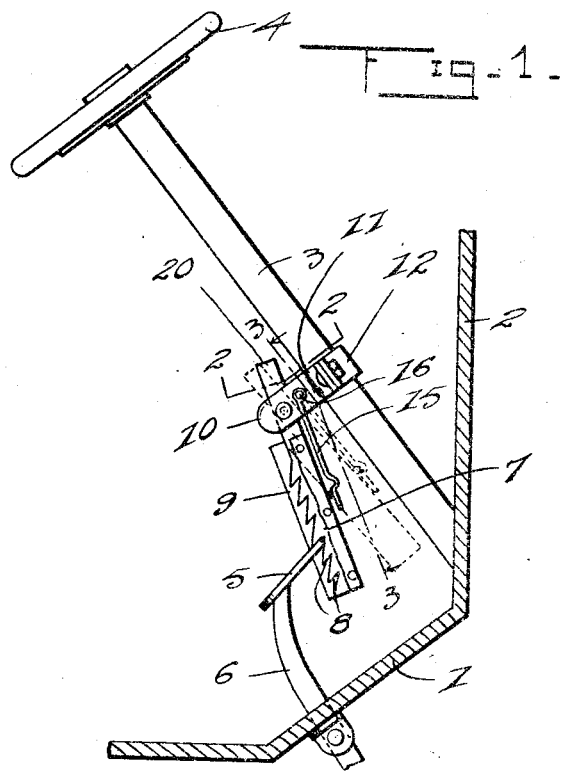
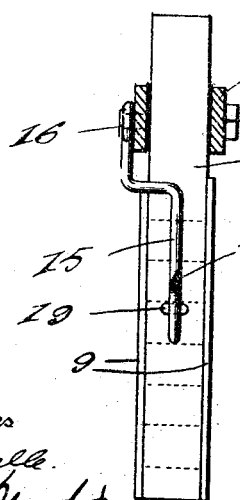
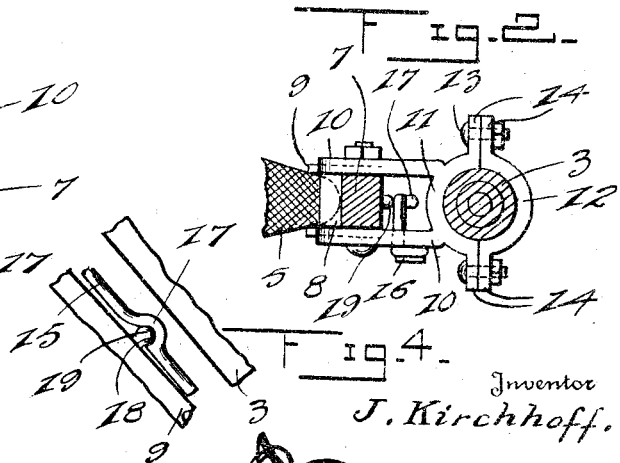
Inventor
J. Kirchhoff.

UNITED STATES PATENT OFFICE.

JOSEPH KIRCHHOFF, OF THE DALLES, OREGON.

ATTACHMENT FOR MOTOR-VEHICLES.

1,193,154.   Specification of Letters Patent.   Patented Aug. 1, 1916.

Application filed November 12, 1915. Serial No. 61,123.

*To all whom it may concern:*

Be it known that I, JOSEPH KIRCHHOFF, a citizen of the United States, residing at The Dalles, in the county of Wasco and State of Oregon, have invented certain new and useful Improvements in Attachments for Motor-Vehicles; and I do hereby declare the following to be a full, clear, and exact description of the invention, such as will enable others skilled in the art to which it appertains to make and use the same.

This invention relates to new and useful improvements in attachments for motor vehicles and the principal object of the invention is to provide a device particularly adapted for use on such vehicles as are provided with the planetary type of change speed gears to enable the operator to throw the low speed in and retain the same in place without keeping his foot on the pedals.

Heretofore in throwing in the low speed pedal much difficulty has been encountered by the operators of the vehicles through the inconvenience of the necessity of keeping the foot on the pedal during the time that the vehicle is moving at low speed.

Another object of the invention is to provide a device which will obviate this objection and which may be readily attached to motor vehicles of the ordinary construction without in any way changing the same.

With these and other objects in view, the invention consists in the novel combination and arrangement of parts which will be fully set forth in the following specification and accompanying drawings, in which:—

Figure 1 is a view illustrating this device in use, a portion of the notched bar being in section. Fig. 2 is a sectional view on line 2—2 of Fig. 1. Fig. 3 is a sectional view on the line 3—3 of Fig. 1, and Fig. 4 is a detail view of the means for holding the attachment in inoperative position under normal circumstances.

Referring to the drawings, the numeral 1 designates the usual inclined foot board of a motor vehicle while the numeral 2 designates the dash.

The ordinary steering column 3 extends upwardly and rearwardly and carries the usual steering wheel 4.

The low speed pedal is designated by the numeral 5 and is mounted on the usual arm which is connected with the low speed mechanism in the ordinary way.

The attachment for the machine consists of a notched bar 7 provided with a plurality of teeth 8 which are formed in one face thereof and between a pair of side flanges 9, these side flanges being adapted to prevent the shoe of the operator from contacting with the teeth. The bar 7 is pivoted between the ears 10 at its upper end which are formed on the section 11 of the sleeve which is adapted to surround the steering post. The coöperating section of the sleeve is designated by the numeral 12 and the two sections are connected by the bolts 13 which extend through the ears 14 formed on said sections.

In order to hold the notched bar in operative position, there is provided a spring 15 the upper end of which is secured to one of the ears as at 16 while the lower end of said spring is provided with the offset portion 17, which forms a notch 18 for engagement with the knob 19 carried by the rear wall of the rack bar. The spring is normally arranged to urge the bar toward the pedal but it will be noted that when the bar is moved so that the knob 19 enters the notch 18 it will engage the knob and hold the rack or latch bar in inoperative position.

The upper end of the bar is provided with the extension 20 which is adapted to be engaged by the foot of the user so as to exert pressure on said bar to spring the notch 18 out of engagement with the knob 19 thereby permitting the bar to swing downwardly and into engagement with the pedal 5. In this way, it will be seen that the device may be readily pushed into or thrown out of operation.

It will be evident from the foregoing that a particularly simple and efficient means for holding the low speed pedal of an ordinary planetary gear motor vehicle is provided which may be readily thrown into and out of operation and which will enable the operator of the motor vehicle to throw in the low speed pedal and hold the same in, without necessitating the keeping of the foot thereon.

While in the foregoing there has been shown and described the preferred embodiment of this invention, it is to be understood that such changes may be made in the combination and arrangement of parts as will fall within the spirit and scope of the appended claims.

What is claimed is:—

1. The combination with a motor vehicle provided with a low speed pedal normally held out of operative position and a steering column, of a notched bar secured to the steering column and adapted to engage and hold the low speed pedal in operative position and spring means to hold the notched bar in and out of operative position with relation to the pedal.

2. In a device of the class described, a bar, a plurality of teeth on the under side of the bar, the bar being pivoted to the steering column on a motor vehicle, the teeth being adapted to engage the low speed pedal of said motor vehicle to hold the same in operative position and a spring carried by the device for holding the notched bar in both operative and inoperative position.

3. The combination with a motor vehicle having a low speed pedal normally held out of operative position and a steering column, of a bracket secured to said steering column, a notched bar secured to the bracket and adapted when in its lowermost position to engage the pedal and hold the same in operative position and when in its uppermost position to hold said pedal out of operative position and means to hold said latch bar in either its uppermost or lowermost position.

4. The combination with a motor vehicle having a low speed pedal normally held out of operative position and a steering column, of a bracket secured to said steering column, a notched bar pivotally secured to said bracket, said notched bar being adapted when in its lowermost position to engage the low speed pedal and hold the same in operative position and when in its uppermost position to disengage said pedal, a spring secured to the bracket, said spring having a notch, said spring normally tending to force the notched bar downwardly and a knob on the notch bar adapted to engage the latch on said spring when the bar is swung upwardly to hold the bar in inoperative position.

5. The combination with a motor vehicle having a low speed pedal normally held out of operative position and a steering column, of a bracket composed of a plurality of sections, bolts for securing said sections to the steering column, parallel ears formed on one of said sections, a notched bar pivotally secured between said ears and adapted when in its lowermost position to engage and hold the low speed pedal in operative position and when in uppermost position to disengage said pedal, a spring secured to one of the ears, said spring having a notch, said spring normally tending to force the notched bar downwardly, and a knob on the rear wall of said notched bar adapted to engage the notch formed on said spring when the bar is swung upwardly to hold the bar in inoperative position.

In testimony whereof I affix my signature in presence of two witnesses.

JOSEPH KIRCHHOFF.

Witnesses:
PAUL W. CHILDERS,
EDWARD WILSON.